(12) United States Patent
Kataoka et al.

(10) Patent No.: US 8,994,681 B2
(45) Date of Patent: Mar. 31, 2015

(54) DECODING IMPRECISE GESTURES FOR GESTURE-KEYBOARDS

(71) Applicant: Google Inc., Mountain View, CA (US)

(72) Inventors: Satoshi Kataoka, Tokyo (JP); Keisuke Kuroyanagi, Tokyo (JP)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/871,876

(22) Filed: Apr. 26, 2013

(65) Prior Publication Data

US 2014/0115521 A1    Apr. 24, 2014

Related U.S. Application Data

(60) Provisional application No. 61/716,456, filed on Oct. 19, 2012.

(51) Int. Cl.
| | |
|---|---|
| *G06F 3/041* | (2006.01) |
| *G06F 3/01* | (2006.01) |
| *G06F 3/023* | (2006.01) |
| *G06F 3/0488* | (2013.01) |
| *G06F 17/27* | (2006.01) |

(52) U.S. Cl.
CPC .............. *G06F 3/017* (2013.01); *G06F 3/0237* (2013.01); *G06F 3/04886* (2013.01); *G06F 17/276* (2013.01)
USPC ........... 345/173; 345/168; 345/169; 715/863; 715/864; 715/773

(58) Field of Classification Search
USPC .......... 345/156, 168, 169, 173, 174; 715/863, 715/864, 773
See application file for complete search history.

(56) References Cited

U.S. PATENT DOCUMENTS

| | | |
|---|---|---|
| 6,292,179 B1 | 9/2001 | Lee |
| 6,801,190 B1 | 10/2004 | Robinson et al. |
| 7,030,863 B2 | 4/2006 | Longe et al. |
| 7,042,443 B2 | 5/2006 | Woodard et al. |

(Continued)

FOREIGN PATENT DOCUMENTS

| | | |
|---|---|---|
| WO | 2005036310 A3 | 4/2005 |
| WO | 2011113057 A1 | 9/2011 |

OTHER PUBLICATIONS

U.S. Appl. No. 60/430,338, by Daniel Suraqui, filed Nov. 29, 2002.

(Continued)

*Primary Examiner* — Koosha Sharifi-Tafreshi
(74) *Attorney, Agent, or Firm* — Shumaker & Sieffert, P.A.

(57) ABSTRACT

In one example, a method includes outputting, by a computing device and for display, a graphical keyboard comprising a plurality of keys. The method may also include receiving, by the computing device, an indication of a gesture detected at a presence-sensitive input device. The method may also include determining, by the computing device and based on a plurality of features associated with the gesture, a degree of precision of the gesture. The method may also include modifying, by the computing device and based at least in part on the degree of precision, a probability that the gesture indicates at least one key of the plurality of keys. The method may also include outputting, by the computing device and for display, a candidate word that is based at least in part on the probability that the gesture indicates at least one key of the plurality of keys.

23 Claims, 6 Drawing Sheets

(56) References Cited

U.S. PATENT DOCUMENTS

| | | |
|---|---|---|
| 7,088,345 B2 | 8/2006 | Robinson et al. |
| 7,145,554 B2 | 12/2006 | Bachmann |
| 7,151,530 B2 | 12/2006 | Roeber et al. |
| 7,199,786 B2 | 4/2007 | Suraqui |
| 7,250,938 B2 | 7/2007 | Kirkland et al. |
| 7,251,367 B2 | 7/2007 | Zhai |
| 7,277,088 B2 | 10/2007 | Robinson et al. |
| 7,508,324 B2 | 3/2009 | Suraqui |
| 7,706,616 B2 | 4/2010 | Kristensson et al. |
| 7,716,579 B2 | 5/2010 | Gunn et al. |
| 7,921,361 B2 | 4/2011 | Gunn et al. |
| 8,036,878 B2 | 10/2011 | Assadollahi |
| 8,135,582 B2 | 3/2012 | Suraqui |
| 2004/0140956 A1* | 7/2004 | Kushler et al. ............ 345/168 |
| 2005/0190973 A1* | 9/2005 | Kristensson et al. ........ 382/229 |
| 2006/0119582 A1 | 6/2006 | Ng et al. |
| 2006/0176283 A1 | 8/2006 | Suraqui |
| 2007/0040813 A1* | 2/2007 | Kushler et al. ............ 345/173 |
| 2008/0270896 A1* | 10/2008 | Kristensson ............... 715/261 |
| 2008/0316183 A1 | 12/2008 | Westerman et al. |
| 2011/0193797 A1* | 8/2011 | Unruh ...................... 345/173 |
| 2012/0036469 A1 | 2/2012 | Suraqui |
| 2013/0046544 A1* | 2/2013 | Kay et al. .................. 704/275 |
| 2013/0067382 A1* | 3/2013 | Townsend et al. ......... 715/773 |

OTHER PUBLICATIONS

U.S. Appl. No. 60/505,724, by Daniel Suraqui, filed Sep. 22, 2003.
Natasha Lomas, "Hey Apple, What the Next iPhone Really, Really Needs Is a Much Better Keyboard," http://techcrunch.com/2013/04/21/the-iphone-keyboard-stinks/?, Apr. 21, 2013, 6 pgs.
International Search Report and Written Opinion for International Application No. PCT/US2013/065479, mailed Mar. 21, 2014, 10 pages.

* cited by examiner

DECODING IMPRECISE GESTURES FOR GESTURE-KEYBOARDS

This application claims the benefit of U.S. Provisional Application No. 61/716,456, filed Oct. 19, 2012, the entire content of which is hereby incorporated by reference.

BACKGROUND

Some computing devices (e.g., mobile phones, tablet computers, etc.) may provide a graphical keyboard as part of a graphical user interface for composing text (e.g., using a presence-sensitive input device and/or display, such as a touchscreen). The graphical keyboard may enable a user of the computing device to enter text (e.g., an e-mail, a text message, or a document, etc.). For instance, a presence-sensitive display of a computing device may output a graphical (or "soft") keyboard that enables the user to enter data by indicating (e.g., by tapping) keys displayed at the presence-sensitive display.

In some cases, the computing device may present a continuous-gesture graphical keyboard (sometimes referred to as a "gesture keyboard" or "combo gesture keyboard") with which a user can interact by sliding his or her finger over regions of the presence-sensitive display that are associated with keys of the graphical keyboard, thereby essentially gesturing a word to be input to the computing device. In other words, the user may input an entire word in a single gesture by tracing over the letters of the word output at a presence-sensitive display. In this way, continuous-gesture graphical keyboards provide an input method that allows the user to enter a word or group of words with a gesture. As such, a continuous-gesture graphical keyboard may allow the user to achieve a certain degree of efficiency, especially compared to one-handed tapping of a presence-sensitive screen (e.g., a presence-sensitive screen operatively coupled to or integrated with a computing device).

However, continuous gesture keyboards may have certain drawbacks. For example, a computing device may generate touch events when a user performs a gesture at a presence-sensitive screen that outputs a continuous gesture graphical keyboard. The touch events may include representations of one or more different locations of the presence-sensitive input device that are traversed by the user's finger when performing the gesture. In some examples, a user may perform an imprecise gesture to input an intended word, thereby generating touch events that do not closely correspond to the locations of the intended keys to enter the word. As such, the continuous gesture keyboard may not correctly determine the word intended by the user. Consequently the computing device may select one or more words and/or characters that the user did not intend to enter, thereby resulting in inaccurate text entry that reduces the speed at which the user may interact with the computing device.

SUMMARY

In one example, a method includes outputting, by a computing device and for display, a graphical keyboard comprising a plurality of keys. The method may also include receiving, by the computing device, an indication of a gesture detected at a presence-sensitive input device. The method may also include determining, by the computing device and based on a plurality of features associated with the gesture, a degree of precision of the gesture. The method may also include modifying, by the computing device and based at least in part on the degree of precision, a probability that the gesture indicates at least one key of the plurality of keys. The method may also include outputting, by the computing device and for display, a candidate word that is based at least in part on the probability that the gesture indicates at least one key of the plurality of keys.

In one example, a computer-readable storage medium encoded with instructions that, when executed, cause one or more processors of a computing device to perform operations including outputting, by the computing device and for display, a graphical keyboard comprising a plurality of keys. The computer-readable storage medium is further encoded with instructions that cause one or more processors of a computing device to perform operations including receiving, by the computing device, an indication of a gesture detected at a presence-sensitive input device. The computer-readable storage medium is further encoded with instructions that cause one or more processors of a computing device to perform operations including determining, by the computing device and based on a plurality of features associated with the gesture, a degree of precision of the gesture. The computer-readable storage medium is further encoded with instructions that cause one or more processors of a computing device to perform operations including modifying, by the computing device and based at least in part on the degree of precision, a probability that the gesture indicates at least one key of the plurality of keys. The computer-readable storage medium is further encoded with instructions that cause one or more processors of a computing device to perform operations including outputting, by the computing device and for display, a candidate word that is based at least in part on the probability that the gesture indicates at least one key of the plurality of keys.

In one example, a computing device includes at least one processor, wherein the at least one processor may be configured to output for display, a graphical keyboard comprising a plurality of keys. In some examples, the at least one processor may be configured to receive an indication of a gesture detected at a presence-sensitive input device. In some examples, the at least one processor may be configured to determine, based on a plurality of features associated with the gesture, a degree of precision of the gesture. In some examples, the at least one processor may be configured to modify, based at least in part on the degree of precision, a probability that the gesture indicates at least one key of the plurality of keys. In some examples, the at least one processor may be configured to output for display, a candidate word that is based at least in part on the probability that the gesture indicates at least one key of the plurality of keys.

The details of one or more examples of the disclosure are set forth in the accompanying drawings and the description below. Other features, objects, and advantages will be apparent from the description and drawings, and from the claims.

DETAILED DESCRIPTION

Figure 1:
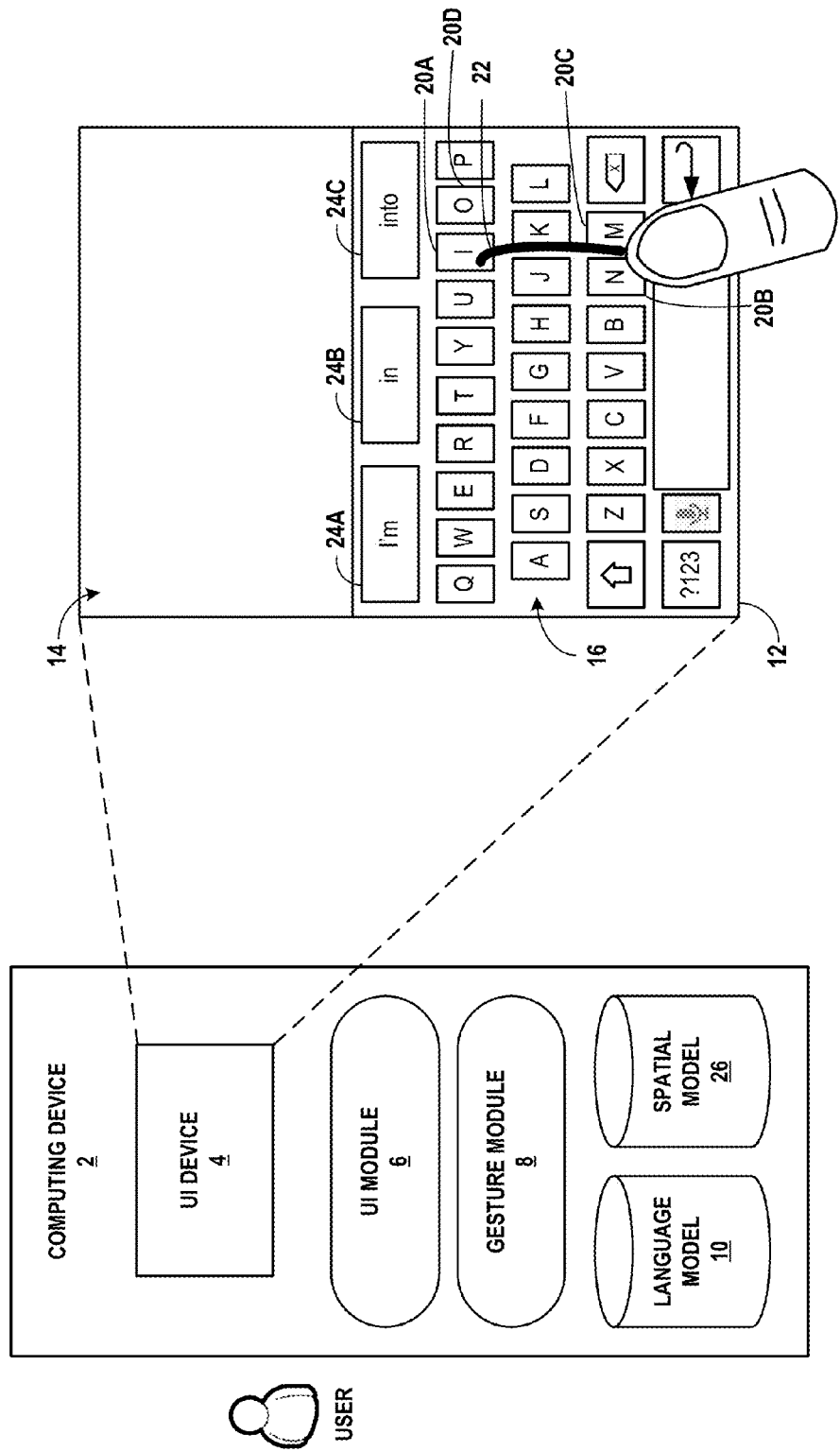
FIG. 1 is a block diagram illustrating an example computing device that may be used to improve key selection for imprecise gestures, in accordance with one or more techniques of the present disclosure.

In general, this disclosure is directed to techniques for improving the accuracy of character and word selection when performing an imprecise gesture using a continuous gesture graphical keyboard, in accordance with techniques of the disclosure. In one example, a presence-sensitive input device may receive text input by a user by detecting user inputs in the form of gestures performed at or near the presence-sensitive input device. In some examples, a user may wish to enter a string of text, for example a word, by performing one or more gestures at or near the presence-sensitive display.

Rather than performing multiple gestures to input a single word, techniques of the present disclosure may improve the speed and accuracy at which a user can enter text using a graphical keyboard of a computing device. For instance, using techniques of this disclosure, a user may, instead of performing a discrete gesture for each key of a word, perform a single gesture that indicates different characters of an intended word. The computing device may incrementally determine one or more candidate words indicated by the gesture as the user performs the gesture. By incrementally determining the candidate words while the gesture is being performed, the computing device may present the user with one or more candidate words during the gesture while reducing post-gesture entry processing time. To determine candidate words, the incremental determinations may include searching, by the computing device, for one or more points of a gesture that each align with a given keyboard position of a letter using a spatial model. The search may include selecting a point of the gesture that best aligns with the letter of the keyboard based on the spatial model.

Based on the search, techniques of the disclosure may construct one or more probable candidate character strings corresponding to the gesture by determining the locations traversed by the gesture and various states in a lexicon (e.g., dictionary) in parallel. In this way, techniques of the disclosure can incrementally determine the probability that the gesture corresponds to one or more words in a lexicon trie, one node/letter at a time. In some examples, techniques of the disclosure may use one or more spatial and/or temporal alignment features to improve the accuracy of the incremental determinations. Such techniques may also support other advanced gesture interactions such two-handed gestures and multi-word gestures.

In accordance with techniques of the disclosure, the computing device may determine the precision or imprecision (e.g., "sloppiness") of a gesture and adjust spatial model probabilities to more accurately select keys intended by the user. To determine the precision of a gesture, the computing device may, for example, determine a straight-line path between two keys of a graphical keyboard. Furthermore, the computing device may determine the actual path of a gesture performed at the presence-sensitive display. By comparing various features (e.g., distance, curvature, etc.) of the straight-line path and the actual path of a gesture, the computing device may determine a magnitude of deviation between the two paths. A larger magnitude of deviation (e.g., the actual gesture includes large arcs that substantially deviate from the straight-line path between two keys) may indicate a gesture performed with lower precision.

In response to determining that a gesture is performed with lower precision, the computing device may adjust one or more spatial model probabilities corresponding to keys of the graphical keyboard. The adjusted spatial model probabilities may reflect lower and/or higher confidence in the prediction of various possible keys due to the lower precision of the gesture. A computing device may also use other features, such as speed of the gesture, intersection of the gesture relative to key areas, etc., as further described herein to determine the precision of a gesture. By modifying the spatial model probabilities based on the determined precision of a gesture, techniques of the disclosure may provide improved character and/or word selection when imprecise gestures are provided at a continuous gesture graphical keyboard.

FIG. 1 is a block diagram illustrating an example computing device 2 that may be used to improve key selection for imprecise gestures, in accordance with one or more techniques of the present disclosure. In some examples, computing device 2 may be associated with a user. The user associated with computing device 2 may interact with the computing device by providing various user inputs into the computing device.

Examples of computing device 2 may include, but are not limited to, portable or mobile devices such as mobile phones (including smart phones), laptop computers, desktop computers, tablet computers, smart television platforms, cameras, personal digital assistants (PDAs), servers, mainframes, etc. As shown in the example of FIG. 1, computing device 2 may be a tablet computer. Computing device 2, in some examples can include user interface (UI) device 4, UI module 6, gesture module 8, and language model 10. Other examples of computing device 2 that implement techniques of this disclosure may include additional components not shown in FIG. 1.

Computing device 2 may include UI device 4. In some examples, UI device 4 is configured to receive tactile, audio, or visual input. UI device 4, as shown in FIG. 1, may include a touch-sensitive and/or presence-sensitive screen or any other type of device for receiving input. In some examples, UI device 4 may output content such as graphical user interface (GUI) 12 for display. In the example of FIG. 1, UI device 4 may be a presence-sensitive display that can display a graphical user interface and receive input from the user using capacitive, inductive, and/or optical detection at or near the presence sensitive display. In some examples, the presence-sensitive display may include a presence-sensitive input device and device for receiving input and a display device for outputting content. In one example, the presence-sensitive input device and the display device may be physically tightly integrated such as in a mobile device. In other examples, the presence-sensitive input device and display device may be included in physically separate devices, as further illustrated in the examples of FIG. 5.

As shown in FIG. 1, computing device 2 may include UI module 6. UI module 6 may perform one or more functions to receive input, such as user input or network data, and send such input to other components associated with computing device 2, such as gesture module 8. For example, UI module 6 may determine a gesture performed by a user at UI device 4. UI module 6 may also receive data from components associated with computing device 2, such as gesture module 8. Using the data, UI module 6 may cause other components associated with computing device 2, such as UI device 4, to provide output based on the data. For instance, UI module 6 may receive data from gesture module 8 that causes UI device 4 to display information in text entry field 14 of GUI 12.

UI module 6 may be implemented in various ways. For example, UI module 6 may be implemented as a downloadable or pre-installed application or "app." In another example, UI module 6 may be implemented as part of a hardware unit of computing device 2. In another example, UI module 6 may be implemented as part of an operating system of computing device 2.

Computing device 2, in some examples, includes gesture module 8. Gesture module 8 may include functionality to perform any variety of operations on computing device 2. For instance, gesture module 8 may include functionality to incrementally determine text from a gesture in accordance with the techniques described herein. Gesture module 8 may be implemented in various ways. For example, gesture module 8 may be implemented as a downloadable or pre-installed application or "app." In another example, gesture module 8 may be implemented as part of a hardware unit of computing device 2. In another example, gesture module 8 may be implemented as part of an operating system of computing device 2.

Gesture module 8 may receive data from components associated with computing device 2, such as UI module 6. For instance, gesture module 8 may receive gesture data from UI module 6 that causes gesture module 8 to determine text from the gesture data. Gesture module 8 may also send data to components associated with computing device 2, such as UI module 6. For instance, gesture module 8 may send text determined from the gesture data to UI module 6 that causes UI device 4 to display GUI 12.

Gesture module 8 of computing device 10 may receive from UI module 6, one or more indications of user input detected at the presence-sensitive screen of UI device 4. Generally, each time UI device 4 receives an indication of user input detected at a location of the presence-sensitive screen, gesture module 8 may receive information about the user input from UI module 6. Gesture module 8 may assemble the information received from UI device 4 into a time-ordered set of events indicative of a gesture, such as a sequence of touch events. Each touch event in the sequence may include data or components that represents parameters (e.g., when, where, originating direction) characterizing a presence and/or movement of input at the presence-sensitive screen. Each touch event in the sequence may include a location component corresponding to a location of UI device 4, a time component related to when UI device 4 detected user input at the location, and an action component related to whether the touch event corresponds to a lift up or a push down at the location. Moreover, one or more of the events may have a concurrent time component, and such events are described as touch events merely for purposes of example and may be indicative of a gesture at any form of presence-sensitive input device.

Gesture module 8 may determine one or more characteristics of the user input based on the sequence of touch events and include information about these one or more characteristics within each touch event in the sequence of touch events. For example, gesture module 8 may determine a start location of the user input, an end location of the user input, a density of a portion of the user input, a speed of a portion of the user input, a direction of a portion of the user input, and a curvature of a portion of the user input. One or more touch events in the sequence of touch events may include (in addition to a time, a location, and an action component as described above) a characteristic component that includes information about one or more characteristics of the user input (e.g., a density, a speed, etc.).

As shown in FIG. 1, GUI 12 may be a user interface generated for display by UI module 6 that allows a user to interact with computing device 2. GUI 12 may include graphical content. Graphical content, generally, may include text, images, a group of moving images, etc. As shown in FIG. 1, graphical content may include graphical keyboard 16, text entry area 14, and word suggestion areas 24A-C (collectively "word suggestion areas 24"). Graphical keyboard 16 may include a plurality of keys, such as "I" key 20A, "N" key 20B, and "M" key 20C. In some examples, each of the plurality of keys included in graphical keyboard 16 represents a single character. In other examples, one or more of the plurality of keys included in graphical keyboard 16 represents a group of characters selected based on a plurality of modes.

In some examples, text entry area 14 may include characters or other graphical content that are included in, for example, a text-message, a document, an e-mail message, a web browser, or any other situation where text entry is desired. For instance, text entry area 14 may include characters or other graphical content that are selected by the user via gestures performed at UI device 4. In some examples, word suggestion areas 24 may each display a word. UI module 6 may cause UI device 4 to display graphical keyboard 16 and detect a gesture having gesture path 22 which is incrementally determined by gesture module 8 in accordance with techniques of the present disclosure further described herein. Additionally, UI module 6 may cause UI device 4 to display a candidate word determined from the gesture in word suggestion areas 24.

To determine a sequence of touch events represents a selection of one or more keys, gesture module 8 may include a spatial model 26. In general, spatial model 26 may generate one or more probabilities that a particular key of a graphical keyboard has been selected based on location data associated with a user input. In some examples, spatial model 26 includes a bivariate Gaussian model for each key. The bivariate Gaussian model for a key may include a distribution of coordinates (e.g., (x,y) coordinate pairs) that correspond to locations of UI device 4 that present the given key. More specifically, in some examples, a bivariate Gaussian model for a key may include a distribution of coordinates that correspond to locations of UI device 4 that are most frequently selected by a user when the user intends to select the given key. The shorter the distance between location data of a user input and a higher density area of spatial model 26, the higher the probability that the key associated with spatial model 26 has been selected. A greater distance between location data of a user input and a higher density area of spatial model 26, the lower the probability that the key associated with spatial model 26 has been selected.

Gesture module 8 may use spatial model 26 to compare the location components (e.g., coordinates) of one or more touch events in the sequence of touch events to respective locations of one or more keys of graphical keyboard 16 and generate a probability based on these comparisons that a selection of a key occurred. In some examples, gesture module 8 may generate a spatial model score (e.g., a spatial model probability) using spatial model 26. The spatial model score may indicate a probability of a selected key based at least in part on locations of UI device 4 traversed by a gesture. In some examples, the spatial model score may indicate a combined probability of a group of selected keys based at least in part on locations of UI device 4 traversed by a gesture.

For example, gesture module 8 may use spatial model 26 to compare the location component of each touch event in the sequence of touch events to a key location of a particular key of graphical keyboard 16. The location component of each touch event in the sequence may include one location of UI device 4. A key location (e.g., a centroid of a key) of a key in graphical keyboard 16 may include a different location of UI device 4. Gesture module 8 may use spatial model 26 to determine a Euclidian distance between the two locations and generate a probability based on the Euclidian distance that the key was selected. Spatial model 26 may indicate a higher probability for a key that shares a smaller Euclidian distance with one or more touch events than a key that shares a greater Euclidian distance with one or more touch events. Based on the spatial model probability associated with each key, gesture module 8 may assemble the individual key selections with the highest spatial model probabilities into a time-ordered sequence of keys that gesture module 8 may then determine represents a character string. In some examples, gesture module 8 may incrementally determine probabilities of different keys as each portion of a gesture is detected by UI device 4. Gesture module 8 may further use the determined keys and language model 10 to determine probable characters, character strings, words and/or groups of characters strings and/or words, based on the characters associated with the determined keys, prior text determined by computing device 2, etc.

Computing device 2, in some examples, also includes language model 10. Language model 10 may include a lexicon. In some examples, a lexicon may include a listing of words and may include additional information about the listed words. A lexicon may be represented by a range of data structures, such as an array, a list, and/or a tree. For example, language model 10 may include a lexicon stored in a trie data structure. A lexicon trie data structure may contain a plurality of nodes, each node may represent a letter. The first node in a lexicon trie may be called the entry node which may not correspond to a letter. In other examples, the entry node may correspond to a letter. Each node may have one or more child nodes. For instance, the entry node may have twenty-six child nodes, each corresponding to a letter of the English alphabet.

A subset of the nodes in a lexicon trie may each include a flag which indicates that the node is a terminal node. Each terminal node of a lexicon trie may indicate a complete word (e.g., a candidate word). In some examples, a group of letters indicated by the nodes along a path of nodes from the entry node to a terminal node may spell out a word indicated by the terminal node. In some examples, language model 10 may be a default dictionary installed on computing device 2. In other examples, language model 10 may include multiple sources of lexicons, which may be stored at computing device 2 or stored at one or more remote computing devices and are accessible to computing device 2 via one or more communication channels.

In some examples, language model 10 may be implemented in the firmware of computing device 2. Language model 10 may include language model frequency information such as n-gram language models. An n-gram language model may provide a probability distribution for an item $x_i$ (letter or word) in a contiguous sequence of items based on the previous items in the sequence (e.g., $P(x_i|x_{i-(n-1)}, \ldots, x_{i-1})$). For instance, a bigram language model (an n-gram model where n=2), may provide a probability that the letter "w" follows the sequence "no". In some examples, language model 10 includes a lexicon trie with integrated language model frequency information. For instance, each node of the lexicon trie may include a representation of a letter and a probability value.

Gesture module 8 may receive data from UI module 6 that represents the sequence of touch events generated by UI module 6. The touch events may include data that represents locations of the UI device 4 where UI device 4 presents each of the keys of graphical keyboard 16. Gesture module 8 may determine, based on the locations of the keys, that the sequence of touch events represents a selection of one or more keys.

Gesture module 8 may generate a character string based on the selection where each character in the character string corresponds to at least one key in the selection. In some examples, gesture module 8 may determine multiple character strings using language model 10 to identify one or more candidate words in language model 10 that include a part of or all of the characters indicated by keys determined by gesture module 8 using spatial model 26. As shown in FIG. 1, a user may perform a gesture 8 at UI device 4 that traverses the keys i-m. Gesture module 8 may therefore perform a lookup of character stings i-m to determine a group of candidate words that begin with i-m and corresponding spatial and language model scores for each respective candidate word. Gesture module 8 may perform such techniques incrementally as the user performs gesture 22. Gesture module 8 may perform a lookup of character stings i-m to determine a group of candidate words that begin with i-m based on spatial and language model scores for each respective candidate word.

In some examples, gesture module 8 determines a combined score for each candidate word based at least in part on the respective spatial and language module scores for each respective candidate word. The combined probability for a candidate word may therefore represent the probability of the candidate word based on a language context and the accuracy of a gesture given a set of keys. Gesture module 8 may order the candidate words in a group of candidate words by combined score in descending order from most probable candidate word to least probable candidate word. In some examples, gesture module 8 may send data to UI module 6 that causes UI device 4 to output one or more candidate words with the highest probabilities as suggested words in suggested word region 24A-24C. In other examples, one or more candidate words with the highest probabilities may be output at edit region 14.

Techniques of the present disclosure may improve the speed and accuracy with which a user can enter text into a computing device. Using techniques of this disclosure, a user may, perform an imprecise gesture to select one or more keys of a graphical keyboard. As the user performs the gesture, the computing device may incrementally determine the keys selected by the user and optionally one or more words indicated by the gesture. The computing device may determine the precision of the gesture and adjust spatial models associated with the keys accordingly to improve the precision with which intended keys of the user are selected by the computing device. Techniques of the disclosure are now further described herein with respect to components of FIG. 1.

As shown in the example of FIG. 1, UI module 6 may cause UI device 4 to display GUI 12. A user may desire to enter text, for example the word "I'm" into text entry area 14. The user, in accordance with the techniques of this disclosure may perform a gesture at graphical keyboard 16. In one example, the gesture may be a continuous motion in which the user's finger moves into proximity with UI device 4 such that the gesture performed by the finger is detected by UI device 4 throughout the performance of the gesture. In a different example, the user may, move his/her finger into proximity with UI device 4 such that the finger is temporarily detected by UI device 4 and then the user's finger moves away from UI device 4 such that the finger is no longer detected. The gesture may include a plurality of portions. In some examples, the gesture may be divided into portions with substantially equivalent time durations. Where the gesture includes a plurality of portions, the gesture may include a final portion which may be portion of the gesture detected prior to detecting that the gesture is complete. For instance, a portion of the gesture may be designated as the final portion where the user moves his/her finger out of proximity with UI device 4 such that the finger is no longer detected.

While the user performs the gesture to select a group of keys of the plurality of keys, UI module 6 may detect a gesture having gesture path 22 at UI device 4. As shown in FIG. 1, the user performs the gesture by tracing gesture path 22 through or near keys of keyboard 16 that correspond to the characters of the desired word (e.g., the characters represented by "I" key 20A and "M" key 20C). UI module 6 may send data that indicates gesture path 22 to gesture module 8. For instance, UI module 6 may incrementally send touch events indicating gesture path 22 to gesture module 8 as gesture path 22 is detected by UI device 4 and received by UI module 6. For instance, UI module 6 may send a stream touch events that includes coordinate pairs indicating gesture path 22 to gesture module 8 as gesture path 22 is detected by UI device 4 and received by UI module 6.

In response to receiving data that represents gesture path 22 from UI module 6, gesture module 8 may determine one or more candidate words. A candidate word may be a word that is composed of a group of keys indicated by gesture path 22. The group of keys may be determined based on gesture path 22 and a lexicon. Gesture module 8 may determine a candidate word by determining a group of alignment points traversed by gesture path 22, determining respective cost values for each of at least two keys of the plurality of keys, and comparing the respective cost values for at least each of at least two keys of the plurality of keys, as further described below. In some examples, the respective cost values may comprise combined scores for each of the at least two keys that are based at least in part on the respective spatial and language module scores for each respective candidate word.

An alignment point may be a point along gesture path 22 that may indicate a key of the plurality of keys. An alignment point may include one or more coordinates corresponding to the determined position of the alignment point. For instance, an alignment point may include Cartesian coordinates corresponding to a point on GUI 12.

In some examples, gesture module 8 determines the group of alignment points traversed by gesture path 22 based on a plurality of features associated with gesture path 22. The plurality of features associated with gesture path 22 may include a length of a segment of gesture path 22. For instance, gesture module 8 may determine the length along the gesture segment from a previous alignment point and the current alignment point. For better alignments, the length will more closely approximate the straight-line distance between to two corresponding keyboard letters.

In another example, gesture module 8 may determine a direction of a segment from a first point to a second point of gesture path 22 to determine the group of alignment points. For better alignments, the direction of the segment will more closely approximate the direction of a straight line from between two corresponding keyboard letters.

In some examples, a curvature of a segment of gesture path 22, a local speed representing a rate at which a segment of path 22 was detected, and a global speed representing a rate at which gesture path 22 was detected. If gesture module 8 determines a slower speed or pause for the local speed, gesture module 8 may determine that a point at the segment is more likely to be an alignment point. If gesture module 8 determines that a gesture was drawn quickly, the gesture module 8 may determine the gesture is more likely to be imprecise and therefore gesture module 8 may increase the weight on the language module (e.g., n-gram frequencies) 10 than the spatial model 26.

As described above, gesture module 8 may use spatial model 26 to determine one or more probabilities that a particular key of graphical keyboard 16 has been selected by the user based on alignment points of gesture 22. In some examples, a spatial model includes a bivariate Gaussian model for a particular key. The bivariate Gaussian model for a key may include a distribution of coordinates (e.g., (x,y) coordinate pairs) that correspond to locations of UI device 4 that display the given key. More specifically, in some examples, a bivariate Gaussian model for a key may include a distribution of coordinates that correspond to locations of UI device 4 that are most frequently selected by a user when the user intends to select the given key. The closer an observed alignment point occurs to a higher density area of the spatial model, the higher the probability that the key associated with the spatial model has been selected. The farther an observed alignment point occurs from a higher density area of the spatial model, the lower the probability that the key associated with the spatial model has been selected.

Figure 3A:
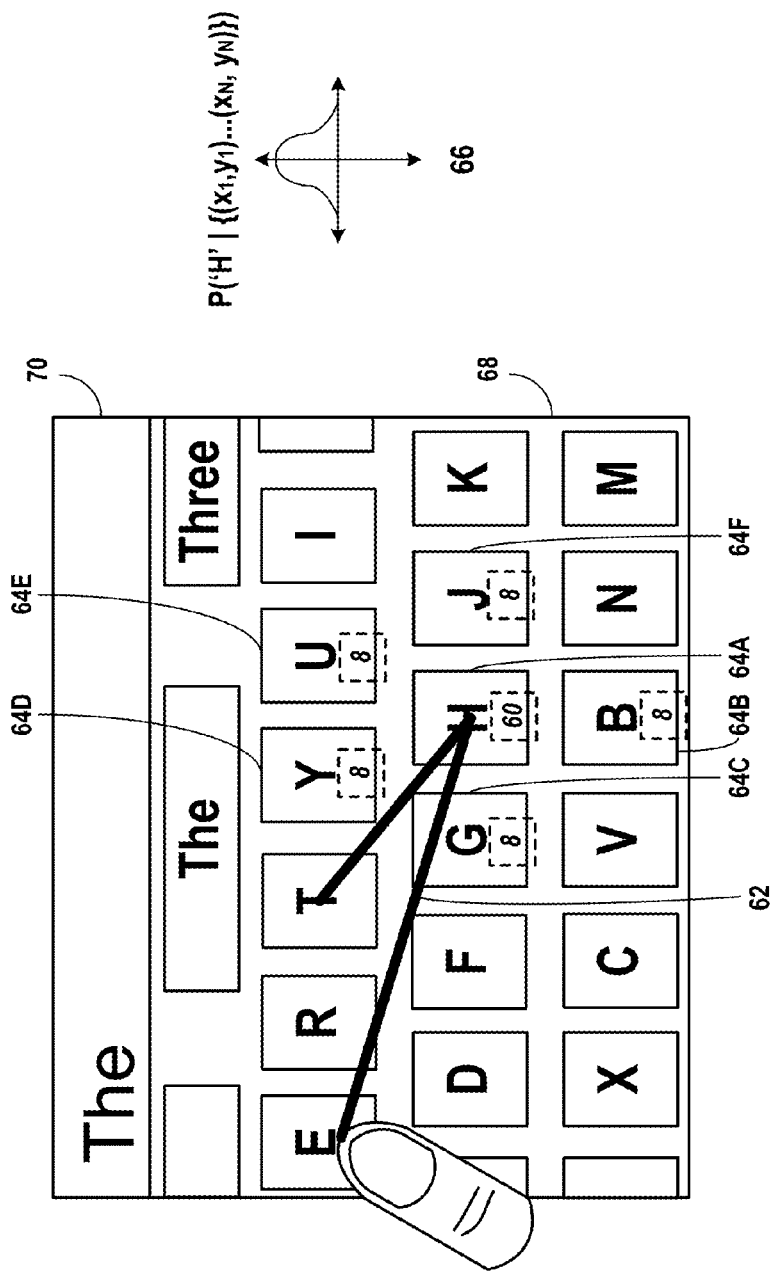
FIGS. 3A-B are block diagrams illustrating further details of one example of a computing device shown in FIG. 1, in accordance with one or more techniques of the present disclosure.

In one example, gesture module 8 may determine an alignment point of the group of alignment points based on a segment of gesture path 22 having a high curvature value. Additionally, gesture module 8 may determine an alignment point of the group of alignment points based on a segment of gesture path 22 having a low local speed (e.g., the user's finger slowed down while performing the segment of the gesture). In the example of FIG. 1, gesture module 8 may determine a first alignment point at the start of gesture path 22, a second alignment point at the point where gesture path 22 experiences a significant change in curvature (e.g., greater than a threshold value), and a third alignment point at the end of gesture path 22. In still other examples, techniques of the disclosure can identify a shape of the gesture as a feature and determine an alignment point based on the shape of the gesture. In some examples, gestures with broad curvatures, e.g., at shown in FIG. 3B may indicate a less precise gesture than tight curvatures, e.g., as shown in FIG. 3A

In some examples, gesture module 8 may determine respective cost values for each of at least two keys of the plurality of keys included in keyboard 16. Each of the respective cost values may represent a probability that an alignment point indicates a key, e.g., based on a combined score using language model 10 and spatial model 26. In some examples, the respective cost values may be based on physical features of the gesture path, the alignment point, and/or the key. For instance, the respective cost values may be based on the physical location of the alignment point with reference to the physical location of the key.

In some examples, the respective cost values may be based on language model 10. For instance, the respective cost values may be based on the probability that a second key will be selected after a first key (e.g., the probability that the "M" key will be selected after the "I" key). In some examples, the keys for which respective cost values are determined based at least in part on language model 10. In some examples, the cost values are lower where there is a greater likelihood that an alignment point indicates a key. In other examples, the cost values are higher where there is a greater likelihood that an alignment point indicates a key.

In the example of FIG. 1, gesture module 8 may determine a first cost value representing a probability that the first alignment point indicates "I" key 20A and a second cost value representing a probability that the second alignment point indicates "N" key 20B. Gesture module 8 may also determine third cost value representing a probability that the second alignment point indicates "M" key 20C.

Gesture module 8 may compare the respective cost values for at least two keys of the plurality of keys to determine a combination of keys having a combined cost value. A combined cost value may represent a probability that gesture path 22 indicates a combination of keys. Gesture module 8 may compare the respective cost values for at least two keys of the plurality of keys to determine which of the at least two keys is indicated by an alignment point. Gesture module 8 may determine a combination of keys by determining which keys are indicated by each alignment point.

In some examples, gesture module 8 determines which of the at least two keys is indicated by an alignment point without regard to which keys are indicated by other alignment points. In other examples, gesture module 8 determines which of the at least two keys is indicated by the alignment point based on which keys are indicated by other alignment points. In such examples, gesture module 8 may revise the determination of which key is indicated by a previous alignment point based on the respective cost values for a current alignment point.

In accordance with techniques of the disclosure, gesture module 8 may determine a degree of precision of gesture 22 based at least in part on one or more features associated with gesture 22. For instance, gesture 22, as shown in FIG. 1, approximately intersects a region between "N" key 20B and "M" key 20C. In such examples, the user may have imprecisely performed gesture 22 because the gesture does not intersect the centroid of "M" key 20C. To determine the precision of gesture 22, gesture module 8 may determine a group of alignment points traversed by the gesture. For example, gesture module 8 may determine a group of alignment that are included substantially in the area between "N" key 20B and "M" key 20C.

Gesture module 8 may determine a distance from one or more of the alignment points to a location of at least one of "N" key 20B and "M" key 20C. For instance, gesture module 8 may determine a distance between the centroid of "M" key 20C and one or more of the alignment points. Gesture module 8 may determine a low degree of precision when the distance between the centroid of "M" key 20C and one or more of the alignment points is less than a threshold distance. Gesture module 8 may determine a degree of precision that is higher than the low degree of precision when the distance between the centroid of "M" key 20C and one or more of the alignment points is greater than a threshold distance. In other examples, gesture module 8 may define a low degree of precision when the distance between the centroid of "M" key 20C and one or more of the alignment points and the distance between the centroid of "N" key 20B and one or more of the alignment points are substantially the same (e.g., indicating a gesture intersecting substantially between two keys rather than through one of the two keys). In other examples, gesture module 8 may determine a degree of precision that is higher than the low degree of precision when the distance between the centroid of "M" key 20C and one or more of the alignment points and the distance between the centroid of "N" key 20B and one or more of the alignment points are substantially different (e.g., indicating a gesture substantially intersecting one of the two keys and not substantially intersecting the other of the two keys).

Upon determining in the current example, that gesture 22 is characterized by a low degree of precision, gesture module 8 may determine language model probabilities for the combinations "I'm" and "in". That is, gesture module 8, may determine a language model probability based on "I" key 20A and "N" key 20B. To determine the language model probability, gesture module 8 may determine one or more candidate words included in language model 10 that include the character string "IN". In one example, language model 10 may include a probability, e.g., represented by the value 49, for the candidate word "in". Gesture module 8 may also determine one or more candidate words included in language model 10 that include the character string "IM". In the current example, language model 10 may include a probability, e.g., 51, for the candidate word "I'm". In the current example, gesture module 8 may determine that the difference between the language model probabilities of "in" and "I'm" is less than a threshold difference. Moreover, gesture module 8 may determine that the degree of precision for gesture 22 is low.

In response to determining the degree of precision of gesture 22 is low and the difference between the language model probabilities of "in" and "I'm" is less than a threshold difference, gesture module 8 may modify a probability that gesture 22 indicates at least one of "N" key 20B and "M" key 20C. For instance, in some examples, gesture module 8 may determine a combined probability that a gesture indicates a key based on a spatial model probability and a language model probability.

In response to determining the degree of precision of gesture 22 is low and the difference between the language model probabilities of "in" and "I'm" is less than a threshold difference, gesture module 8 may, to modify the combined probability, such as decreasing the language model probability and/or increasing the spatial model probability that are included in the combined probability that a gesture indicates a key. As one example, gesture module 8 may decrease the language model probability and/or increase the spatial model probability to improve the precision of a key selection by relying more heavily on the spatial model to determine the intended key. Because the user is more likely to have gestured slightly in the direction of the intended key when performing the imprecise gesture, gesture module 8 may rely more heavily on the spatial model that may accurately indicate the intended key. Example techniques for modifying a probability, such as a combined probability, spatial model probability, and/or language model probability are further described with respect to FIGS. 2-5.

Upon modifying, for example, a combined probability that the gesture indicates one or more keys, gesture module 8 may determine one or more candidate character strings that may include prefixes of candidate words modeled by language model 10. Gesture module 8 may select a group of one or more candidate words associated with a group of highest combined scores that satisfy a threshold. For instance, gesture module 8 may select a group of 3 candidate words associated with a group of highest combined scores that are greater than the candidate word with the fourth highest combined score. In other examples, the threshold may indicate a quantity of candidate words. For instance, the threshold may be 3 and therefore gesture module 8 may determine the three candidate words with the highest combined scores. In response to determining the group of one or more candidate words, gesture module 8 may send data to UI module 6 that causes UI device 4 to output each of the candidate words in the group of one or more candidate words. For example, as shown in FIG. 1, UI device 4 may output candidate words "I'm", "in", and "into" within word suggestion regions 24A-24C, respectively. In this way, computing device 2 may output for display, a candidate word that is based at least in part on a modified probability that the gesture indicates at least one key of the plurality of keys, where computing device 2 modified, based at least in part on the degree of precision of gesture path 20C, the probability that the gesture 20C indicates at least one key of the plurality of keys.

Figure 2:
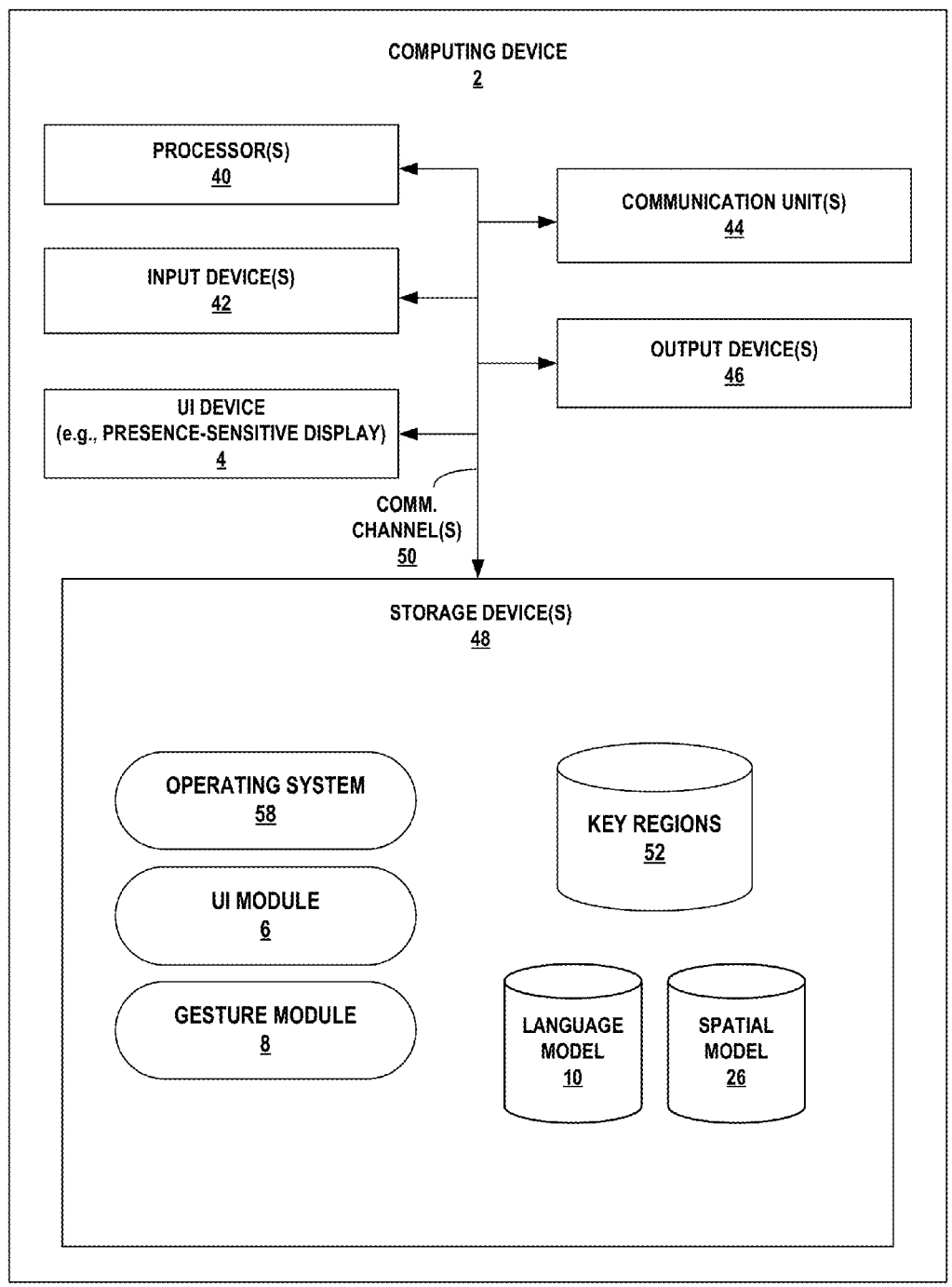
FIG. 2 is a block diagram illustrating further details of one example of a computing device as shown in FIG. 1, in accordance with one or more techniques of the present disclosure.

FIG. 2 is a block diagram illustrating further details of one example of computing device 2 shown in FIG. 1, in accordance with one or more techniques of the present disclosure. FIG. 2 illustrates only one particular example of computing device 2 as shown in FIG. 1, and many other examples of computing device 2 may be used in other instances.

As shown in the specific example of FIG. 2, computing device 2 includes one or more processors 40, one or more input devices 42, one or more communication units 44, one or more output devices 46, one or more storage devices 48, and user interface (UI) device 4. Computing device 2, in one example further includes UI module 6, gesture module 8, and operating system 58 that are executable by computing device 2. Computing device 2, in one example, further includes language model 10, key regions 52, active beam 54, and next beam 56. Each of components 4, 40, 42, 44, 46, and 48 (physically, communicatively, and/or operatively) for inter-component communications. In some examples, communication channels 50 may include a system bus, a network connection, an inter-process communication data structure, or any other method for communicating data. As one example in FIG. 2, components 4, 40, 42, 44, 46, and 48 may be coupled by one or more communication channels 50. UI module 6 and gesture module 8 may also communicate information with one another as well as with other components in computing device 2, such as language model 10, key regions 52, active beam 54, and next beam 56.

Processors 40, in one example, are configured to implement functionality and/or process instructions for execution within computing device 2. For example, processors 40 may be capable of processing instructions stored in storage device 48. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry. Although shown in FIGS. 1 and 2 as a stand-alone computing device 2 for purposes of example, a computing-device may be any component or system that includes a processor 40 or other suitable computing environment for executing software instructions and, for example, need not necessarily include UI device 4.

One or more storage devices 48 may be configured to store information within computing device 2 during operation. Storage device 48, in some examples, is described as a computer-readable storage medium. In some examples, storage device 48 is a temporary memory, meaning that a primary purpose of storage device 48 is not long-term storage. Storage device 48, in some examples, is described as a volatile memory, meaning that storage device 48 does not maintain stored contents when the computer is turned off. Examples of volatile memories include random access memories (RAM), dynamic random access memories (DRAM), static random access memories (SRAM), and other forms of volatile memories known in the art. In some examples, storage device 48 is used to store program instructions for execution by processors 40. Storage device 48, in one example, is used by software or applications running on computing device 2 (e.g., gesture module 8) to temporarily store information during program execution.

Storage devices 48, in some examples, also include one or more computer-readable storage media. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 44. Computing device 2, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 2 utilizes communication unit 44 to wirelessly communicate with an external device such as a server.

Computing device 2, in one example, also includes one or more input devices 42. Input device 42, in some examples, is configured to receive input from a user through tactile, audio, or video feedback. Examples of input device 42 include a presence-sensitive display, a mouse, a keyboard, a voice responsive system, video camera, microphone or any other type of device for detecting a command from a user. In some examples, a presence-sensitive display includes a touch-sensitive screen.

One or more output devices 46 may also be included in computing device 2. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user.

In some examples, UI device 4 may include functionality of input device 42 and/or output device 46. In the example of FIG. 2, UI device 4 may be a presence-sensitive display. In some examples, a presence sensitive display may detect an object at and/or near the screen of the presence-sensitive display. As one example range, a presence-sensitive display may detect an object, such as a finger or stylus that is within 2 inches or less of the physical screen of the presence-sensitive display. The presence-sensitive display may determine a location (e.g., an (x,y) coordinate) of the presence-sensitive display at which the object was detected. In another example range, a presence-sensitive display may detect an object 6 inches or less from the physical screen of the presence-sensitive display and other exemplary ranges are also possible. The presence-sensitive display may determine the location of the display selected by a user's finger using capacitive, inductive, and/or optical recognition techniques. In some examples, presence sensitive display provides output to a user using tactile, audio, or video stimuli as described with respect to output device 46.

Computing device 2 may include operating system 58. Operating system 58, in some examples, controls the operation of components of computing device 2. For example, operating system 58, in one example, facilitates the communication of UI module 6 and/or gesture module 8 with processors 40, communication unit 44, storage device 48, input device 42, and output device 46. UI module 6 and gesture module 8 may each include program instructions and/or data that are executable by computing device 2. As one example, UI module 6 may include instructions that cause computing device 2 to perform one or more of the operations and actions described in the present disclosure.

Computing device 2 can include additional components that, for clarity, are not shown in FIG. 2. For example, computing device 2 can include a battery to provide power to the components of computing device 2. Similarly, the components of computing device 2 shown in FIG. 2 may not be necessary in every example of computing device 2. For example, in some configurations, computing device 2 may not include communication unit 44.

In accordance with the techniques of this disclosure, computing device 2 may output a graphical keyboard comprising a plurality of keys at output device 44. The user may perform a gesture to select a group of keys of the plurality of keys at input device 42. In response to the user performing the gesture, input device 42 may detect a gesture path, such as gesture path 22 of FIG. 1, which may be received by UI module 6 as gesture path data. UI module 6 may then send the gesture path data, e.g., one or more indications of the gesture, to gesture module 8. In some examples, UI module 6 incrementally sends the gesture path data to gesture module 8 as gesture path 22 is detected by input device 42.

In response to receiving the gesture path data, gesture module 8 may create a token at the entry node of a lexicon trie which may be included in language model 10. In some examples, language model 10 may be implemented as a trie data structure. Each movable token may represent a partial alignment between a node in the lexicon (e.g., partial word) and a point along the gesture. As the token advances to child nodes in the lexicon (e.g., next letters in the word) the corresponding alignment point on the gesture may advance as well. As the token advances to the next letter in a word, techniques of the disclosure may determine how far the token needs to advance along the gesture-path. For instance, techniques of the disclosure may include search for an alignment point along the gesture that best aligns to a letter of a key, taking into account a number of features described below.

Gesture module 8 may push the token into a data structure such as a beam or table that stores word prefixes corresponding to different possible combinations of keys of the graphical keyboard. Gesture module 8 may create a token copy on each of the token's child nodes. In the example of FIG. 1, gesture module 8 may create a first token copy on the child node representing the letter "I" and a second token copy on the child node representing the letter "M".

For each token copy, gesture module 8 may determine, based on a plurality of features associated with the gesture path data, an alignment point traversed by the gesture. In the example of FIG. 1, gesture module 8 may determine that a first alignment point is located at the start of gesture path 22. In some examples, gesture module 8 may determine the curvature of the path at a point along the gesture path. In such examples, gesture module 8 may determine that the point is more likely to be an alignment point where there is a high curvature (where the gesture path changes direction abruptly at the point). In other examples, gesture module 8 may determine a mid-segment curvature (the maximum curvature of the gesture path between two points along the gesture). In another example, gesture module 8 may determine that a point is less likely to be the next alignment point where there is a high mid-segment curvature. In some examples, gesture module 8 may determine that a point is an alignment point based on the speed at which the gesture path was detected. In some examples, a slower rate of detection indicates that the point is an alignment point. In some examples, a high mid-segment curvature may indicate that there were corners between a first point and a second point, suggesting that the second point is less likely to be the next alignment point (e.g., a point was missed in-between).

In some examples, an alignment point may be based on the maximum distance between points of a gesture segment between two or more points and an ideal line from a first key to a second key. An ideal line may be, e.g., a shortest distance path from the first key to the second key. For a better alignment the maximum distance may be small, signifying that the gesture segment does not deviate from the ideal line.

For each alignment point, gesture module 8 may determine respective cost values for each of at least two keys of the plurality of keys. Each of the respective cost values may represent a probability that the alignment point indicates a key of the plurality of keys. In the example of FIG. 1, gesture module 8 may determine a first cost value representing a probability that the first alignment point indicates the node representing the letter "I" that is included in a first token, and a second cost value representing a probability that the first alignment point indicates the node representing the letter "U" in a second token. In some examples, gesture module 8 may update each token with its respective cost value. In the example of FIG. 1, gesture module 8 may update the first cost value in the first token copy and the second cost value in the second token copy.

In some examples, gesture module 8 determines the respective cost values by comparing respective physical cost values (e.g., spatial model scores) with respective lexical cost values (e.g., language model scores), as further described below. Gesture module 8 may weight the respective physical cost values based on spatial model 26 differently than the respective lexical cost values based on language model 10. For instance, gesture module 8 may determine a cost value by summing the result of multiplying a physical cost value by a physical weighting value, and multiplying a lexical cost value by a lexical weighting value.

In some examples, gesture module 8 may determine that the lexical cost values should be weighted greater than the physical cost values. Gesture module 8 may determine that the lexical cost values should be weighted greater than the physical cost values where there is an indication that the physical cost values may be imprecise, such as where the gesture path is detected at high rate of speed. For instance, gesture module 8 may determine that a value associated with a feature (e.g., speed) satisfies one or more thresholds. For instance, gesture module 8 may determine that speed of the gesture is greater than or equal to a threshold value. In other examples, gesture module 8 may determine that the speed of the gesture is less than or equal to a threshold value. In any case, gesture module 8 may determine that the physical cost values are unreliable if the determined value satisfies a threshold.

In some examples, gesture module 8 may determine that the physical cost values should be weighted greater than the lexical cost values. Gesture module 8 may determine that the physical cost values should be weighted greater than the lexical cost values where there is an indication that the lexical cost values may be imprecise, such as where the user has a history of entering words not included in the lexicon.

In some examples, gesture module 8 may determine respective physical cost values for each of the at least two keys of the plurality of keys. Each of the respective physical cost values may represent a probability that physical features of an alignment point of the group of alignment points indicate physical features of a key of the plurality of keys. For instance, gesture module 8 may determine the respective physical cost values by evaluating the Euclidian distance between an alignment point of the group of alignment points and a keyboard position of key. Physical features of the plurality of keys may be included in key regions 52. For example, key regions 52 may include, for each of the plurality of keys, a set of coordinates that correspond to a location and/or area of graphical keyboard 16 where each key is displayed. In the example of FIG. 1, gesture module 8 may determine a first physical cost value based on the Euclidian distance between the first alignment point and "I" key 20A. In some examples, gesture module 8 may determine the physical cost values by comparing the Euclidian distance between a first alignment point and a second alignment point with the Euclidian distance between a first letter indicated by the first alignment point and a second letter which may be represented by the second alignment point. Gesture module 8 may determine that the cost value of the second letter is inversely proportional to the difference between the distances (e.g., that the second letter is more probable where the distances are more similar). For instance, a smaller distance may suggest a better alignment.

In some examples, gesture module 8 may determine the respective physical cost values (e.g., spatial model scores) for each of the at least two key of the plurality of keys using one or more spatial models such as spatial model 26. As further illustrated in FIGS. 3A-3B, gesture module 8 may, upon determining an alignment point, determine a first spatial model score for a first key that is proximal to the alignment point and a second spatial model score for a second key that is proximal to the alignment point. Gesture module 8 may determine the first spatial score by comparing the location of the alignment point to a spatial model corresponding to the first key. As described herein, the first spatial model may include a distribution of coordinates that correspond to locations of UI device 4 that are most frequently selected for a given key. Gesture module 8 may determine the first spatial model score by comparing the location of the alignment point to the distribution of coordinates. Gesture module 8 may determine a higher spatial model score for the first key if the location of the alignment point is in a higher density region of the coordinates of the first spatial model and a lower spatial model score for the first key if the location of the alignment point is in a lower density region of the coordinates of the first spatial model. Gesture module 8 may similarly determine the second spatial model score in a similar manner using a second spatial model corresponding to the second key.

In accordance with techniques of the disclosure, gesture module 8 may determine that the degree of precision of the gesture does not satisfy a threshold and modify one or more spatial model scores. To modify the first and second spatial model scores, gesture module 8 may increase and/or decrease one or more of the first spatial model score and/or the second spatial model score. For instance, gesture module 8 may determine that the first spatial model score is greater than the second spatial model score. Gesture module 8 may decrease the first spatial model score by a first weight. Gesture module 8 may increase the spatial model score by a second weight. In some examples, the first weight and the second weight may be the same while in other examples, the weights may be different. By modifying the first and second spatial model scores in response to an imprecise gesture, gesture module 8 may increase the equalization of the first and second spatial model scores to reflect a lower confidence that the first key may have been intended by the user and an increased confidence that the second key may have been intended by the user.

Gesture module 8 may also determine the respective cost values by determining respective lexical cost values (e.g., language model scores) for each of the at least two keys of the plurality of keys. Each of the respective lexical cost values may represent a probability that a letter represented by a key of the plurality of keys is included in the candidate word. The lexical cost values may be based on language model 10. For instance, the lexical cost values may represent the likelihood that a given letter is selected based on probable words included in language model 10. In the example of FIG. 1, gesture module 8 may determine a first lexical cost value based on an entry in language model 10 indicating a frequency that the letter "I" is the first letter in a word.

Gesture module 8 may determine whether the token is at a terminal node of the lexicon. In response to determining that the token is at a terminal node, gesture module 8 may add the token (or a representation thereof) to a list of output predictions. In some cases, gesture module 8 may compare the respective cost values for each node from the entry node to the terminal node to determine a combined cost value for the word indicated by the terminal node. In other cases, the combined cost value for the word indicated by the terminal node may be reflected by the token's cost value. In either case, gesture module 8 may then discard the token. For instance, in one example, in the token passing process gesture module 8 may keep only a group of top-n tokens, and discard the rest. The top n tokens may be the tokens with the most likely words or character strings. In this way, gesture module 8 may efficiently scale to large lexicons. Alternative embodiments may use any suitable search techniques.

In some examples, such as described in FIG. 1, the lexical cost values for a first key and a second key may be similar (e.g., the difference between two lexical cost values is less than a threshold). For example, m and n may have similar lexical cost values when following the letter i. To determine more precisely which of keys m and n the user intended, gesture module 8 may modify the lexical cost values associated with i-m and i-n. For instance, gesture module 8 may decrease the lexical cost values associated with prefixes i-m and i-n, which thereby increases the significance of the spatial model scores associated with n and m. That is, because gesture module 8 may determine candidate words based on prefixes that are each associated with a combined score comprising a language and spatial model score, decreasing the language model score may increase the significance of the spatial model score for a given prefix. Since the user likely gestured in the direction of the intended character, the spatial model scores for n and m having increased significance, may provide a more accurate indication of which key the user intended. Gesture module 8 in some examples, may increase the spatial model scores to increase the significance of the spatial model scores in such examples where the lexical cost values may be similar. Consequently, by modifying one or more spatial and/or language model scores that used to generated a combined probability associated with a candidate word, gesture module 8 may modify, based at least in part on the degree of precision of a gesture, the probability that the gesture indicates at least one key of the plurality of keys and output a candidate word that is based at least in part on the probability that the gesture indicates at least one key of the plurality of keys.

Gesture module 8 may determine whether UI module 6 has completed receiving the gesture path data. Where UI module 6 has completed receiving the gesture path data, gesture module 8 may output one or more candidate words for display at the presence-sensitive display. Where UI module 6 has not completed receiving the gesture path data, gesture module 8 may continue to incrementally process the gesture path data. In some examples, gesture module 8 may output one or more output predictions (e.g., candidate words) determined in accordance with techniques of the disclosure, prior to UI module 6 completing reception of the gesture path data.

Figure 3B:
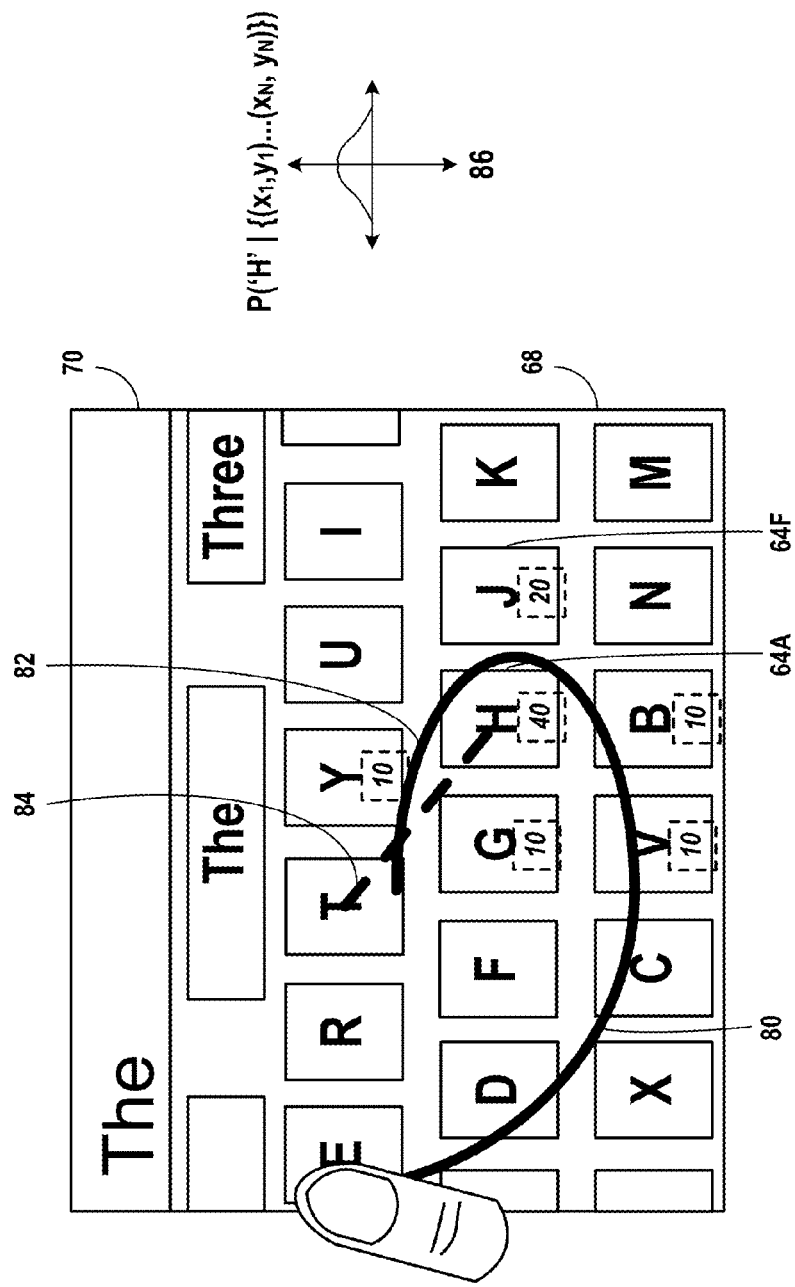

FIGS. 3A-B are block diagrams illustrating further details of example operation of computing device 2 shown in FIG. 1, in accordance with one or more techniques of the present disclosure. In particular, FIG. 3A illustrates a portion of graphical keyboard 68 and text entry field 70 that may be output by computing device 2. Graphical keyboard 68 includes a plurality of keys including "H" key 64A, "B" key 64B, "G" key 64C, "Y" key 64D, "U" key 64E, and "J" key 64F. In the example of 3A, the user may perform a precise gesture 62 to enter the word "The" as illustrated in text entry field 70. Gesture 62 is characterized by substantially straight-line paths from the "T" key to the "H" key to the "E" key. The straight-line paths may be the substantially minimal distance paths between keys. Additionally, the curvature of gesture 62 may be high, indicating a decisive change in direction from "H" key 64A to the "E" key. Furthermore, gesture 62 intersects substantially at the centroid of "H" key 64A before changing direction. Thus, the user may have performed gesture 62 with a high level of precision.

In the example of FIG. 3A, spatial model probabilities are illustrated for each of keys 64A-64F within the key boundary of each key and enclosed by a dashed line. Each spatial model probability is shown in FIG. 3A for purposes of illustration and may not be output in GUI 70. When the user performs a gesture 62 that includes a gesture path from the "T" key to "H" key 64A, gesture module 8 may determine spatial model probabilities for each of keys 64A-64F. Gesture module 8 may determine the spatial model probabilities for each of the given keys because each key is within a threshold distance of a detected direction change in gesture 22 that occurs within the area of key 64A. As shown in FIG. 3A, the spatial model probability for "H" key 64A given the detected alignment points at or near "H" key 64A is determined be a value "60". Gesture module 8 may similarly determine a spatial model probability of "8" for "J" key 64F based on the detected alignment points of gesture 62. In some examples, gesture module 8 determines one or more features (e.g., change in direction, curvature, distance from key center, etc.) based on the alignment points to generate the respective probabilities. Consequently, in the example of FIG. 3A, the spatial model probability for "H" key 64A is highest because of the higher curvature, larger change in speed, larger change in direction, and directional change distance from the center of "H" key 64A. Probability distribution 66 illustrates the spatial model probability for "H" key 64A given the alignment points of gesture 62.

In contrast to FIG. 3A, the example of FIG. 3B illustrates an imprecise gesture. In FIG. 3B, the user may perform a gesture 80 to also input the word "The". However, in FIG. 3B, a portion of the gesture path of gesture 82 from the "T" key to "H" key 64A may be of a different distance than the straight-line path from key "T" to "H" key 64A. Thus in some examples, in accordance with techniques of the disclosure, gesture module 8 may compare the portion of the gesture path of gesture 82 from the "T" key to "H" key 64A and the straight-line path to determine the degree of precision of gesture 82. Gesture module 8 may determine a lower degree of precision for gestures that deviate substantially from the straight-line path between two keys. Conversely, gesture module 8 may determine a higher degree of precision for gestures that do not deviate substantially from the straight-line path between two keys. A degree of precision in some examples may be a numerical value included in a range of degrees of precision. As described in this disclosure, gesture module 8 can modify spatial model probabilities, language model probabilities, and/or combined probabilities based at least in part on the degree of precision of a gesture. In some examples, gesture module 8 modifies one or more of the aforementioned probabilities proportional to the degree of precision while in other examples, gesture module 8 modifies one or more of the aforementioned probabilities in a manner that is not proportional to the degree of precision.

In other examples, gesture module 8 may determine a degree of precision based on a speed of a portion of gesture 82 between the "T" key to "H" key 64A. Higher speed may indicate less precise gestures while lower speeds may indicate more precise gestures. Thus, when a speed of a portion of gesture 82, for example, is compared with a threshold speed to determine that the speed of the portion of gesture 82 is greater than the threshold speed, gesture module 82 may determine the degree of precision of gesture 82 is lower. The converse may also hold true when the speed of the portion of gesture 82 is less than threshold speed.

In other examples, gesture module 8 may determine a degree of precision based on a curvature of a portion of gesture 82 between the "T" key to "H" key 64A. Higher curvatures may indicate more precise gestures while lower curvatures may indicate less precise gestures. Thus, when a curvature of a portion of gesture 82, for example, is compared with a threshold curvature to determine that the curvature of the portion of gesture 82 is less than the threshold curvature, gesture module 82 may determine the degree of precision of gesture 82 is lower. The converse may also hold true when the curvature of the portion of gesture 82 is greater than threshold speed.

In response to determining a degree of precision of gesture 82 is less than a threshold degree of precision, gesture module 82 may decrease the probability that gesture 82 indicates "H" key 64A. For instance, gesture module 82 may decrease the spatial model probability that gesture 82 indicates "H" 64A when the degree of precision is lower. Thus, in contrast to FIG. 3A which illustrated a precise gesture 62 and spatial model probability of "60" for "H" key 64A, FIG. 3B illustrates a spatial model probability of "40" for "H" key 64A. In this way, when the user performs a less precise (e.g., "sloppier") gesture, gesture module 8 modifies the spatial model probability for "H" key 64A to indicate a lower confidence that "H" key 64A was intended to be selected by the user.

In some examples, gesture module 8 also determines one or more keys proximal to "H" key 64A. Keys proximal to "H" key 64A may be within a predetermined distance of "H" key 64A, such as "J" key 64F. Gesture module 8 may determine the spatial model probabilities for each of the given keys proximal to "H" key 64A because each key is within a threshold distance of a detected direction change in gesture 82 that occurs within the area of key 64A. In response to determining one or more keys proximal to "H" key 64A, gesture module 8 may modify the spatial model probability of "J" key 64F to reflect indicate a lower confidence that "H" key 64A was intended to be selected by the user and a higher confidence that "J" key 64F was intended to be selected by the user. Thus, as shown in FIG. 3B, the spatial model probability associated with "J" key 64F is "20" in contrast to the spatial model probability of "8" associated with "J" key 64F in FIG. 3A. Probability distribution 68 illustrates the lower spatial model probability for "H" key 64A given the alignment points of gesture 82. Consequently, when gesture module 8 determines combined scores based on the spatial model probabilities (e.g., spatial model scores) and/or language model probabilities for the candidate character strings, the spatial model probability for H in the combined score may be lower than in FIG. 3A. As a consequence, in some examples of gesture module 8 implementing techniques of the disclosure, gesture module 8 may cause different candidate words to be output for display based on the imprecision (e.g., "sloppiness") of gesture that results in modified spatial model score. Such different candidate words may be words that were more likely intended by the user when performing the imprecise gesture.

Figure 4:
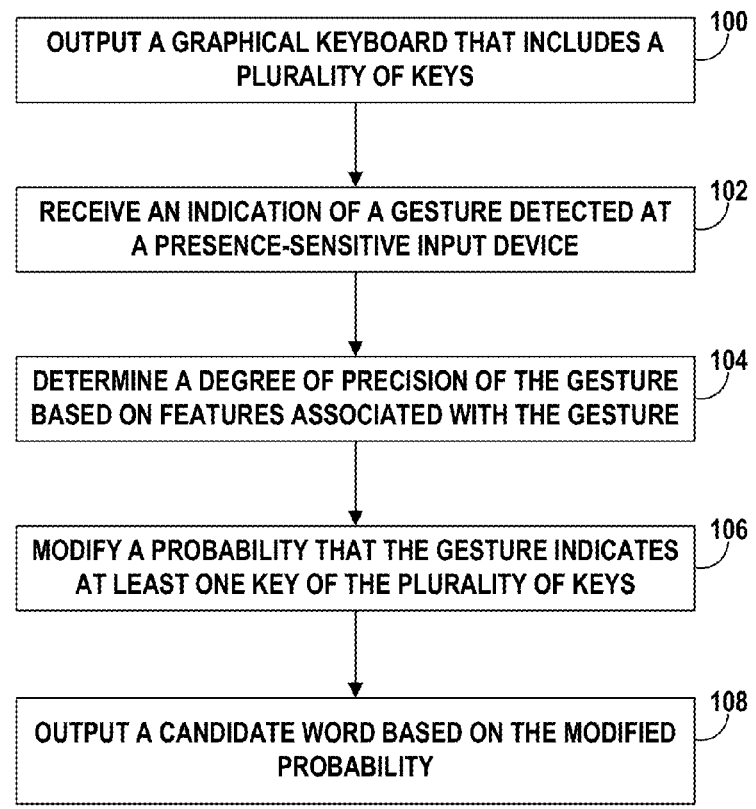
FIG. 4 is a flow diagram illustrating example operations of a computing device that may improve key selection for imprecise gestures, in accordance with one or more techniques of the present disclosure.

FIG. 4 is a flow diagram illustrating example operations of a computing device that may improve key selection for imprecise gestures, in accordance with one or more techniques of the present disclosure.

In the example of FIG. 4, computing device 2 may initially output for display, a graphical keyboard comprising a plurality of keys (100). Computing device 2 may receive an indication of a gesture detected at a presence-sensitive input device (102). Computing device 2 may also determine based on a plurality of features associated with the gesture, a degree of precision of the gesture (104). Computing device 2 may also modify, based at least in part on the degree of precision, a probability that the gesture indicates at least one key of the plurality of keys (106). Computing device 2 may further output for display, a candidate word that is based at least in part on the probability that the gesture indicates at least one key of the plurality of keys (108).

In some examples, the operations may include determining, by the computing device, a first distance of a portion of the gesture between a first key and a second key in the group of keys; determining, by the computing device, a second distance between the first key and the second key, wherein the second distance is a distance of a straight-line path between the first key and the second key; and comparing, by the computing device, the first distance and the second distance to determine the degree of precision of the gesture. In some examples, the operations may include determining, by the computing device, a speed of a portion of the gesture between a first key and a second key in the group of keys; and comparing, by the computing device, the speed of the portion of the gesture to at least one threshold speed to determine the degree of precision of the gesture.

In some examples, the operations may include determining, by the computing device, a curvature of a portion of the gesture between a first key and a second key in the group of keys; and comparing, by the computing device, the curvature of the portion of the gesture to at least one threshold curvature to determine the degree of precision of the gesture. In some examples, the operations may include, in response to determining that the degree of precision is less than a threshold degree of precision, decreasing, by the computing device, the probability that the gesture indicates the at least one key of the plurality of keys. In some examples, the operations may include, in response to determining that the degree of precision is greater than a threshold degree of precision, increasing, by the computing device, the probability that the gesture indicates the at least one key of the plurality of keys.

In some examples, the probability that the gesture indicates at least one key of the plurality of keys comprises may be based at least in part on a spatial model probability associated with the at least one key of the plurality of keys. In some examples, the operations may include modifying, by the computing device and based at least in part on the degree of precision, the spatial model probability of the spatial model associated with the at least one key. In some examples, the operations may include determining, by the computing device, a second key of the plurality of keys that is proximal to the first key; and modifying, by the computing device and based at least in part on the degree of precision, a second probability that the gesture indicates the second key of the plurality of keys." In some examples, the second key of the plurality of keys that is within a predetermined distance of the first key.

In some examples, the operations may include, in response to determining that the degree of precision is less than threshold degree of precision, increasing, by the computing device, the second probability that the gesture indicates the second key of the plurality of keys. In some examples, the operations may include, determining, by the computing device, a second key of the plurality of keys that is proximal to the first key; determining, by the computing device and based on the plurality of features associated with the gesture, a group of alignment points traversed by the gesture; determining, by the computing device and based on the group of alignment points, a distance between at least one of the group of alignment points and a location associated with at least one of the first key and the second key; defining, by the computing device and based at least in part on the distance, the degree of precision.

In some examples, the operations may include, in response to determining that the degree of precision satisfies a threshold degree of precision, modifying, by the computing device, the probability that the gesture indicates at least one key of the plurality of keys. In some examples, the operations may include in response to determining that the degree of precision is less than a threshold degree of precision, decreasing, by the computing device, the probability that the gesture indicates at least one key of the plurality of keys. In some examples, the operations may include determining, by the computing device, a second key of the plurality of keys that is proximal to the first key; determining, by the computing device, a first language model probability that is based at least in part on the first key and a candidate word included in a lexicon; determining by the computing device, a second language model probability that is based at least in part on the second key and a candidate word included in the lexicon; defining, by the computing device, the degree of precision based at least in part on a difference between the first language model probability and the second language model probability.

In some examples, the operations may include in response to determining that the degree of precision satisfies a threshold difference, modifying, by the computing device and based at least in part on the degree of precision, the spatial model probability associated with the at least one key of the plurality of keys. In some examples, the operations may include determining, by the computing device, that the degree of precision is less than the threshold degree of precision. In some examples, the plurality of features associated with the gesture comprises at least one of: a length of a segment of the gesture, wherein the segment comprises a path traversed by the gesture at the presence-sensitive display; a direction of the segment of the gesture; a curvature of the segment of the gesture; a local speed that represents a rate at which the segment of the gesture was detected; and a global speed that represents a rate at which the gesture was detected.

Figure 5:
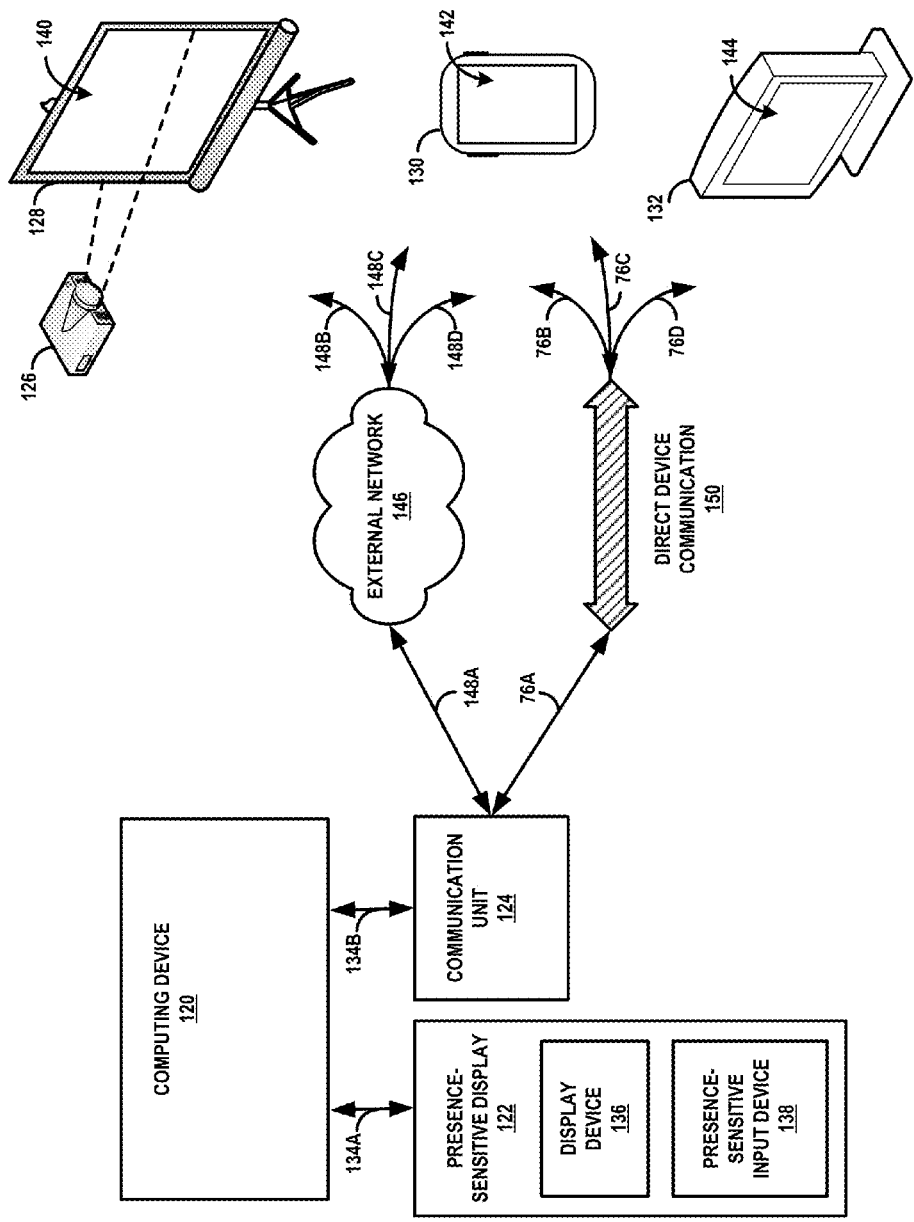
FIG. 5 is a block diagram illustrating an example computing device that outputs graphical content for display at a remote device, in accordance with one or more techniques of the present disclosure.

FIG. 5 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 5 includes a computing device 120, presence-sensitive display 122, communication unit 124, projector 126, projector screen 128, mobile device 130, and visual display device 132. Although shown for purposes of example in FIGS. 1 and 2 as a stand-alone computing device 2, a computing device such as computing device 120 may, generally, be any component or system that includes a processor or other suitable computing environment for executing software instructions and, for example, need not include a presence-sensitive display.

As shown in the example of FIG. 5, computing device 120 may be a processor that includes functionality as described with respect to processor 40 in FIG. 2. In such examples, computing device 120 may be operatively coupled to presence-sensitive display 122 by a communication channel 134A, which may be a system bus or other suitable connection. Computing device 120 may also be operatively coupled to communication unit 124, further described below, by a communication channel 134B, which may also be a system bus or other suitable connection. Although shown separately as an example in FIG. 5, computing device 120 may be operatively coupled to presence-sensitive display 122 and communication unit 124 by any number of one or more communication channels.

In other examples, such as illustrated previously by computing device 2 in FIGS. 1-2, a computing device may refer to a portable or mobile device such as mobile phones (including smart phones), laptop computers, etc. In some examples, a computing device may be a desktop computers, tablet computers, smart television platforms, cameras, personal digital assistants (PDAs), servers, mainframes, etc.

Presence-sensitive display 122, like UI device 4 as shown in FIG. 1, may include display device 136 and presence-sensitive input device 138. Display device 136 may, for example, receive data from computing device 120 and display the graphical content. In some examples, presence-sensitive input device 138 may determine one or more user inputs (e.g., continuous gestures, multi-touch gestures, single-touch gestures, etc.) at presence-sensitive display 122 using capacitive, inductive, and/or optical recognition techniques and send indications of such user input to computing device 120 using communication channel 134A. In some examples, presence-sensitive input device 138 may be physically positioned on top of display device 136 such that, when a user positions an input unit over a graphical element displayed by display device 136, the location at which presence-sensitive input device 138 corresponds to the location of display device 136 at which the graphical element is displayed. In other examples, presence-sensitive input device 138 may be positioned physically apart from display device 136, and locations of presence-sensitive input device 138 may correspond to locations of display device 136, such that input can be made at presence-sensitive input device 138 for interacting with graphical elements displayed at corresponding locations of display device 136.

As shown in FIG. 5, computing device 120 may also include and/or be operatively coupled with communication unit 124. Communication unit 124 may include functionality of communication unit 44 as described in FIG. 2. Examples of communication unit 124 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 120 may also include and/or be operatively coupled with one or more other devices, e.g., input devices, output devices, memory, storage devices, etc. that are not shown in FIG. 5 for purposes of brevity and illustration.

FIG. 5 also illustrates a projector 126 and projector screen 128. Other such examples of projection devices may include electronic whiteboards, holographic display devices, and any other suitable devices for displaying graphical content. Projector 126 and projector screen 128 may include one or more communication units that enable the respective devices to communicate with computing device 120. In some examples, the one or more communication units may enable communication between projector 126 and projector screen 128. Projector 126 may receive data from computing device 120 that includes graphical content. Projector 126, in response to receiving the data, may project the graphical content onto projector screen 128. In some examples, projector 126 may determine one or more user inputs (e.g., continuous gestures, multi-touch gestures, single-touch gestures, etc.) at projector screen using optical recognition or other suitable techniques and send indications of such user input using one or more communication units to computing device 120. In such examples, projector screen 128 may be unnecessary, and projector 126 may project graphical content on any suitable medium and detect one or more user inputs using optical recognition or other such suitable techniques.

Projector screen 128, in some examples, may include a presence-sensitive display 140. Presence-sensitive display 140 may include a subset of functionality or all of the functionality of UI device 4 as described in this disclosure. In some examples, presence-sensitive display 140 may include additional functionality. Projector screen 128 (e.g., an electronic whiteboard), may receive data from computing device 120 and display the graphical content. In some examples, presence-sensitive display 140 may determine one or more user inputs (e.g., continuous gestures, multi-touch gestures, single-touch gestures, etc.) at projector screen 128 using capacitive, inductive, and/or optical recognition techniques and send indications of such user input using one or more communication units to computing device 120.

FIG. 5 also illustrates mobile device 130 and visual display device 132. Mobile device 130 and visual display device 132 may each include computing and connectivity capabilities. Examples of mobile device 130 may include e-reader devices, convertible notebook devices, hybrid slate devices, etc. Examples of visual display device 132 may include other semi-stationary devices such as televisions, computer monitors, etc. As shown in FIG. 5, mobile device 130 may include a presence-sensitive display 142. Visual display device 132 may include a presence-sensitive display 144. Presence-sensitive displays 142, 144 may include a subset of functionality or all of the functionality of presence-sensitive display 4 as described in this disclosure. In some examples, presence-sensitive displays 142, 144 may include additional functionality. In any case, presence-sensitive display 144, for example, may receive data from computing device 120 and display the graphical content. In some examples, presence-sensitive display 144 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 120.

As described above, in some examples, computing device 120 may output graphical content for display at presence-sensitive display 122 that is coupled to computing device 120 by a system bus or other suitable communication channel. Computing device 120 may also output graphical content for display at one or more remote devices, such as projector 126, projector screen 128, mobile device 130, and visual display device 132. For instance, computing device 120 may execute one or more instructions to generate and/or modify graphical content in accordance with techniques of the present disclosure. Computing device 120 may output the data that includes the graphical content to a communication unit of computing device 120, such as communication unit 124. Communication unit 124 may send the data to one or more of the remote devices, such as projector 126, projector screen 128, mobile device 130, and/or visual display device 132. In this way, computing device 120 may output the graphical content for display at one or more of the remote devices. In some examples, one or more of the remote devices may output the graphical content at a presence-sensitive display that is included in and/or operatively coupled to the respective remote devices.

In some examples, computing device 120 may not output graphical content at presence-sensitive display 122 that is operatively coupled to computing device 120. In other examples, computing device 120 may output graphical content for display at both a presence-sensitive display 122 that is coupled to computing device 120 by communication channel 134A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 120 and output for display at presence-sensitive display 122 may be different than graphical content display output for display at one or more remote devices.

Computing device 120 may send and receive data using any suitable communication techniques. For example, computing device 120 may be operatively coupled to external network 146 using network link 148A. Each of the remote devices illustrated in FIG. 5 may be operatively coupled to network external network 146 by one of respective network links 148B, 148C, and 148D. External network 146 may include network hubs, network switches, network routers, etc., that are operatively inter-coupled thereby providing for the exchange of information between computing device 120 and the remote devices illustrated in FIG. 5. In some examples, network links 148A-148D may be Ethernet, ATM or other network connections. Such connections may be wireless and/or wired connections.

In some examples, computing device 120 may be operatively coupled to one or more of the remote devices included in FIG. 5 using direct device communication 150. Direct device communication 150 may include communications through which computing device 120 sends and receives data directly with a remote device, using wired or wireless communication. That is, in some examples of direct device communication 150, data sent by computing device 120 may not be forwarded by one or more additional devices before being received at the remote device, and vice-versa. Examples of direct device communication 150 may include Bluetooth, Near-Field Communication, Universal Serial Bus, WiFi, infrared, etc. One or more of the remote devices illustrated in FIG. 5 may be operatively coupled with computing device 120 by communication links 154A-154D. In some examples, communication links 154A-154D may be connections using Bluetooth, Near-Field Communication, Universal Serial Bus, infrared, etc. Such connections may be wireless and/or wired connections.

In accordance with techniques of the disclosure, computing device 120 may be operatively coupled to visual display device 132 using external network 146. Computing device 120 may output for display at presence-sensitive display 144, a graphical keyboard comprising a plurality of keys. For instance, computing device 120 may send data that includes a representation of the graphical keyboard to communication unit 124. Communication unit 124 may send the data that includes the representation of the graphical keyboard to visual display device 132 using external network 146. Visual display device 132, in response to receiving the data using external network 146, may cause presence-sensitive display 144 to output the graphical keyboard. In response to a user performing a gesture at presence-sensitive display 144 to select a group of keys of the graphical keyboard (e.g., at a region of presence-sensitive display 144 that outputs the graphical keyboard), visual display device 132 may send an indication of the gesture to computing device 120 using external network 146. Communication unit 124 of may receive the indication of the gesture, and send the indication to computing device 120.

In response to receiving an indication of the gesture, computing device 120 may determine, based on a plurality of features associated with the gesture, a degree of precision of the gesture. Computing device 120 may modify, based at least in part on the degree of precision, a probability that the gesture indicates at least one key of the plurality of keys. Computing device 120 may output for display, a candidate word that is based at least in part on the probability that the gesture indicates at least one key of the plurality of keys. For instance, computing device 120 may send data representing the candidate word to communication unit 124. Communication unit 124 may send the data to visual display device 132 via external network 146. Visual display device 132 may cause presence-sensitive display 144 to output the at least one word represented by the data.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Various examples have been described. These and other examples are within the scope of the following claims.

The invention claimed is:

1. A method comprising:
   outputting, by a computing device and for display, a graphical keyboard comprising a plurality of keys;
   receiving, by the computing device, an indication of a gesture detected at a presence-sensitive input device that traverses a first key and a second key that are each included in the plurality of keys;
   determining, by the computing device, a first distance of a portion of the gesture between the first key and the second key, and a second distance between the first key and the second key, wherein the first distance is a distance traversed by the gesture between first key and the second key, wherein the second distance is a distance of a straight-line path between the first key and the second key;
   comparing, by the computing device, the first distance and the second distance to determine a value that represents a degree of precision of the gesture;
   determining, by the computing device and based at least in part on comparing a particular location of the gesture with a spatial model associated with a particular key of the plurality of keys, a spatial model probability that indicates a probability that the particular key is selected by a user of the computing device;
   responsive to determining that the value that represents the degree of precision of the gesture satisfies a threshold degree of degree of precision, modifying, by the computing device and based at least in part on the value that represents the degree of precision, the spatial model probability that the gesture indicates the particular key; and
   outputting, by the computing device and for display, a candidate word that is based at least in part on the probability that the gesture indicates the the particular key of the plurality of keys.

2. The method of claim 1, wherein the degree of precision of the gesture satisfies the threshold degree of degree of precision if the degree of precision is less than the threshold degree of precision, wherein modifying the spatial model probability that the gesture indicates the particular key of the plurality of keys further comprises:
   responsive to determining that the degree of precision is less than the threshold degree of precision, decreasing, by the computing device, the spatial model probability that the gesture indicates the particular key of the plurality of keys.

3. The method of claim 1, wherein the degree of precision of the gesture satisfies the threshold degree of degree of precision if the degree of precision is greater than the threshold degree of precision, wherein modifying the spatial model probability that the gesture indicates the particular key of the plurality of keys further comprises:
   responsive to determining that the degree of precision is greater than the threshold degree of precision, increasing, by the computing device, the probability that the gesture indicates the particular key of the plurality of keys.

4. The method of claim 1,
   wherein the probability that the gesture indicates the particular key of the plurality of keys is based at least in part on the spatial model probability associated with the particular key of the plurality of keys, and
   wherein modifying, by the computing device and based at least in part on the degree of precision, the spatial model probability that the gesture indicates the particular key of the plurality of keys further comprises modifying, by the computing device and based at least in part on the degree of precision, the spatial model probability of the spatial model associated with the particular key.

5. The method of claim 1, wherein a combined probability that the gesture indicates the particular key of the plurality of keys is based at least in part on the spatial model probability associated with the particular key of the plurality of keys and a language model probability, wherein the language model probability is based at least in part on a character associated with the particular key.

6. A non-transitory computer-readable storage medium encoded with instructions that, when executed, cause one or more processors of a computing device to perform operations comprising:
   outputting, for display, a graphical keyboard comprising a plurality of keys;
   receiving an indication of a gesture detected at a presence-sensitive input device that traverses a first key and a second key that are each included in the plurality of keys;
   determining a first distance of a portion of the gesture between the first key and the second key, and a second distance between the first key and the second key, wherein the first distance is a distance traversed by the gesture between first key and the second key, wherein the second distance is a distance of a straight-line path between the first key and the second key;
   comparing the first distance and the second distance to determine value that represents a the degree of precision of the gesture;
   determining, based at least in part on comparing a particular location of the gesture with a spatial model associated with a particular key of the plurality of keys, a spatial model probability that indicates a probability that the particular key is selected by a user of the computing device;
   responsive to determining that the value that represents the degree of precision of the gesture satisfies a threshold degree of degree of precision, modifying, based at least in part on the value that represents the degree of precision, the spatial model probability that the gesture indicates the particular key; and outputting, for display, a candidate word that is based at least in part on the probability that the gesture indicates the particular key of the plurality of keys.

7. The non-transitory computer-readable storage medium of claim 6, wherein the degree of precision of the gesture satisfies the threshold degree of degree of precision if the degree of precision is less than the threshold degree of precision, the non-transitory computer-readable storage medium encoded with instructions that, when executed, cause one or more processors of the computing device to perform operations comprising:
responsive to determining that the degree of precision is less than the threshold degree of precision, decreasing the spatial model probability that the gesture indicates the particular key of the plurality of keys.

8. The non-transitory computer-readable storage medium of claim 6, wherein the degree of precision of the gesture satisfies the threshold degree of degree of precision if the degree of precision is less than the threshold degree of precision, encoded with instructions that, when executed, cause one or more processors of the computing device to perform operations comprising:
responsive to determining that the degree of precision is greater than the threshold degree of precision, increasing the probability that the gesture indicates the particular key of the plurality of keys.

9. The non-transitory computer-readable storage medium of claim 6,
wherein the probability that the gesture indicates the particular key of the plurality of keys is based at least in part on the spatial model probability associated with the particular key of the plurality of keys, and
wherein modifying, based at least in part on the degree of precision, the spatial model probability that the gesture indicates the particular key of the plurality of keys further comprises modifying, based at least in part on the degree of precision, the spatial model probability of the spatial model associated with the particular key.

10. The non-transitory computer-readable storage medium of claim 6, wherein a combined probability that the gesture indicates the particular key of the plurality of keys is based at least in part on the spatial model probability associated with the particular key of the plurality of keys and a language model probability, wherein the language model probability is based at least in part on a character associated with the particular key.

11. A computing device comprising:
at least one processor,
wherein the at least one processor is configured to:
output, for display, a graphical keyboard comprising a plurality of keys;
receive an indication of a gesture detected at a presence-sensitive input device that traverses a first key and a second key that are each included in the plurality of keys;
determine a first distance of a portion of the gesture between the first key and the second key, and a second distance between the first key and the second key, wherein the first distance is a distance traversed by the gesture between first key and the second key, wherein the second distance is a distance of a straight-line path between the first key and the second key;
compare the first distance and the second distance to determine a value that represents a degree of precision of the gesture;
determine, based at least in part on comparing a particular location of the gesture with a spatial model associated with a particular key of the plurality of keys, a spatial model probability that indicates a probability that the particular key is selected by a user of the computing device;
responsive to determining that the value that represents the degree of precision of the gesture satisfies a threshold degree of degree of precision, modify, based at least in part on the value that represents the degree of precision, the spatial model probability that the gesture indicates the particular key of the plurality of keys; and
output, for display, a candidate word that is based at least in part on the probability that the gesture indicates the particular key of the plurality of keys.

12. The computing device of claim 11, wherein the degree of precision of the gesture satisfies the threshold degree of degree of precision if the degree of precision is less than the threshold degree of precision, wherein the at least one processor is configured to:
responsive to determining that the degree of precision is less than the threshold degree of precision, decrease the spatial model probability that the gesture indicates the particular key of the plurality of keys.

13. The computing device of claim 11, wherein the degree of precision of the gesture satisfies the threshold degree of degree of precision if the degree of precision is less than the threshold degree of precision, wherein the at least one processor is configured to:
responsive to determining that the degree of precision is greater than the threshold degree of precision, increase the probability that the gesture indicates the particular key of the plurality of keys.

14. The computing device of claim 11,
wherein the probability that the gesture indicates at least one key of the plurality of keys is based at least in part on a spatial model probability associated with the at least one key of the plurality of keys, and
wherein the at least one processor configured to modify, based at least in part on the degree of precision, the spatial model probability that the gesture indicates the particular key of the plurality of keys is configured to modify, based at least in part on the degree of precision, the spatial model probability of the spatial model associated with the particular key.

15. The computing device of claim 11, wherein a combined probability that the gesture indicates the particular key of the plurality of keys is based at least in part on the spatial model probability associated with the particular key of the plurality of keys and a language model probability, wherein the language model probability is based at least in part on a character associated with the particular key.

16. A method comprising:
outputting, by a computing device and for display, a graphical keyboard comprising a plurality of keys;
receiving, by the computing device, an indication of a gesture detected at a presence-sensitive input device that traverses a first key and a second key that are each included in the plurality of keys;
determining, by the computing device, a speed of a portion of the gesture between the first key and the second key;
comparing, by the computing device, the speed of the portion of the gesture to at least one threshold speed to determine a value that represents a degree of precision of the gesture;
determining, by the computing device and based at least in part on comparing a particular location of the gesture with a spatial model associated with a particular key of the plurality of keys, a spatial model probability that indicates a probability that the particular key is intended to be selected by a user of the computing device;

responsive to determining that the value that represents the degree of precision of the gesture is greater than a threshold degree of degree of precision, modifying, by the computing device and based at least in part on the value that represents the degree of precision, the spatial model probability that the gesture indicates the particular key of the plurality of keys; and outputting, by the computing device and for display, a candidate word that is based at least in part on the probability that the gesture indicates the particular key of the plurality of keys.

17. A computing device comprising:

at least one processor, wherein the at least one processor is configured to:

output, for display, a graphical keyboard comprising a plurality of keys;

receive an indication of a gesture detected at a presence-sensitive input device that traverses a first key and a second key that are each included in the plurality of keys;

determine a speed of a portion of the gesture between the first key and the second key;

compare the speed of the portion of the gesture to at least one threshold speed to determine a value that represents a degree of precision of the gesture;

determine, based at least in part on comparing a particular location of the gesture with a spatial model associated with a particular key, a spatial model probability that indicates a probability that the particular key is intended to be selected by a user of the computing device;

responsive to determining that the value that represents the degree of precision of the gesture is greater than a threshold degree of degree of precision, modify, based at least in part on the value that represents the degree of precision, the spatial model probability that the gesture indicates the particular key of the plurality of keys; and output, for display, a candidate word that is based at least in part on the probability that the gesture indicates the particular key of the plurality of keys.

18. A method comprising:

outputting, by a computing device and for display, a graphical keyboard comprising a plurality of keys;

receiving, by the computing device, an indication of a gesture detected at a presence-sensitive input device that traverses a first key and a second key that are each included in the plurality of keys;

determining, by the computing device, a curvature of a portion of the gesture between the first key and the second key;

comparing, by the computing device, the curvature of the portion of the gesture to at least one threshold curvature to determine a value that represents a degree of precision of the gesture;

determining, by the computing device and based at least in part on comparing a particular location of the gesture with a spatial model associated with a particular key, a spatial model probability that indicates a probability that the particular key is selected by a user of the computing device;

responsive to determining that the value that represents the degree of precision of the gesture satisfies a threshold degree of degree of precision, modifying, by the computing device and based at least in part on the value that represents the degree of precision, the spatial model probability that the gesture indicates the particular key of the plurality of keys; and outputting, by the computing device and for display, a candidate word that is based at least in part on the probability that the gesture indicates the particular key of the plurality of keys.

19. A computing device comprising:

at least one processor, wherein the at least one processor is configured to:

output, for display, a graphical keyboard comprising a plurality of keys;

receive an indication of a gesture detected at a presence-sensitive input device that traverses a first key and a second key that are each included in the plurality of keys;

determine a curvature of a portion of the gesture between the first key and the second key;

compare the curvature of the portion of the gesture to at least one threshold curvature to determine a value that represents a degree of precision of the gesture;

determine, based at least in part on comparing a particular location of the gesture with a spatial model associated with a particular key, a spatial model probability that indicates a probability that the particular key is intended to be selected by a user of the computing device;

responsive to determining that the value that represents the degree of precision of the gesture is greater than a threshold degree of degree of precision, modify, based at least in part on the value that represents the degree of precision the spatial model probability that the gesture indicates the particular key of the plurality of keys; and output, for display, a candidate word that is based at least in part on the probability that the gesture indicates the particular key of the plurality of keys.

20. The method of claim 1, further comprising:

determining, by the computing device, the first key and the second key; and responsive to determining the first key and the second key, determining, by the computing device, the distance of the straight-line path between the first key and the second key.

21. The method of claim 1, wherein the spatial model generates one or more probabilities that a particular key of a graphical keyboard has been selected based on location data associated with a user input.

22. The method of claim 1, wherein the spatial model includes a plurality of bivariate Gaussian models, each respective bivariate Gaussian model associated with a respective key of the graphical keyboard.

23. The method of claim 22, wherein a respective bivariate Gaussian model associated with a respective key comprises a distribution of coordinates corresponding to locations of a presence-sensitive input device that are associated with the given key.

* * * * *